United States Patent
Shen et al.

(10) Patent No.: US 8,404,039 B2
(45) Date of Patent: Mar. 26, 2013

(54) SECONDARY SYNTHETIC METHOD FOR CALCIUM SULPHOALUMINATE MINERAL IN PORTLAND CEMENT CLINKER

(75) Inventors: Xiaodong Shen, Jiangsu (CN); Suhua Ma, Jiangsu (CN); Xuerun Li, Jiangsu (CN); Lin Chen, Jiangsu (CN); Weiqiang Zhou, Jiangsu (CN); Song Deng, Jiangsu (CN)

(73) Assignee: Nanjing University of Technology, Nanjing (CN)

( * ) Notice: Subject to any disclaimer, the term of this patent is extended or adjusted under 35 U.S.C. 154(b) by 0 days.

(21) Appl. No.: 13/509,794

(22) PCT Filed: Jul. 15, 2010

(86) PCT No.: PCT/CN2010/075188
§ 371 (c)(1),
(2), (4) Date: May 14, 2012

(87) PCT Pub. No.: WO2011/057506
PCT Pub. Date: May 19, 2011

(65) Prior Publication Data
US 2012/0285350 A1  Nov. 15, 2012

(30) Foreign Application Priority Data
Nov. 13, 2009  (CN) .......................... 2009 1 0212645

(51) Int. Cl.
C04B 7/04 (2006.01)
C04B 7/47 (2006.01)
C04B 7/48 (2006.01)
C04B 7/52 (2006.01)
(52) U.S. Cl. ......... 106/765; 106/735; 106/739; 106/757
(58) Field of Classification Search .................. 106/735, 106/739, 757, 765
See application file for complete search history.

(56) References Cited

U.S. PATENT DOCUMENTS

| | | | | |
|---|---|---|---|---|
| 6,599,123 | B2 * | 7/2003 | Ramirez-Tobias et al. | 432/14 |
| 6,695,910 | B2 * | 2/2004 | Classen et al. | 106/739 |
| 6,730,162 | B1 * | 5/2004 | Li et al. | 106/772 |
| 7,001,454 | B2 * | 2/2006 | Lopez-Gonzales et al. | 106/739 |
| 7,850,776 | B2 * | 12/2010 | Gartner et al. | 106/692 |
| 8,021,478 | B2 * | 9/2011 | Ramirez Tobias et al. | 106/739 |
| 8,177,903 | B2 * | 5/2012 | Walenta et al. | 106/695 |
| 8,268,071 | B2 * | 9/2012 | Pasquier et al. | 106/693 |

FOREIGN PATENT DOCUMENTS

| | | |
|---|---|---|
| CN | 1490270 A | 4/2004 |
| CN | 101134647 A | 3/2008 |
| CN | 101216433 A | 7/2008 |
| CN | 101717209 A | 6/2010 |
| EP | 0 812 811 A1 | 12/1997 |
| WO | WO 2011/057506 A1 | 5/2011 |

OTHER PUBLICATIONS

Derwent-Acc-No. 2006-190402, abstract of Russian Patent Specification No. RU 2270812 C2 (Feb. 2006).*
International Search Report, Application No. PCT/CN2011/075188, dated Nov. 4, 2010, 4 pages.

* cited by examiner

*Primary Examiner* — Anthony J Green
(74) *Attorney, Agent, or Firm* — Knobbe, Martens, Olson & Bear, LLP

(57) ABSTRACT

A method for secondarily synthesizing calcium sulphoaluminate mineral in Portland cement clinker is provided. The method includes adding gypsum into raw Portland cement, calcination, then heating twice to re-form calcium sulphoaluminate mineral that has decomposed at high temperature in the clinker. This method can increase the content of calcium sulphoaluminate mineral in the clinker. As a result, the advantages of the calcium sulphoaluminate mineral in the clinker may be obtained, such as improvement of the early stage performance and long-term performance of the cement clinker and increase in the quantity of mixture in the cement.

9 Claims, No Drawings

SECONDARY SYNTHETIC METHOD FOR CALCIUM SULPHOALUMINATE MINERAL IN PORTLAND CEMENT CLINKER

CROSS-REFERENCE TO RELATED APPLICATIONS

This Application is the U.S. National Phase under 35 U.S.C. §371 of International Application No. PCT/CN2010/075188, filed Jul. 15, 2010, which was published in Chinese as International Publication No. WO/2011/057506 on May 19, 2011, and claims the benefit of CN 200910212645.0, filed on Nov. 13, 2009. Each of these references is hereby incorporated by reference in their entirety.

BACKGROUND

1. Field of the Invention

The present invention relates to the preparation process of high cementitious cement clinker, more specifically, it relates to secondary synthetic method of calcium sulphoaluminate in Portland cement clinker.

2. Description of the Related Art

The key issue in the preparation of Portland cement clinker containing $C_4A_3\bar{S}$ (Ye'elimite) mineral is the problem of coexistence of $C_4A_3\bar{S}$ and Alite, wherein $C_4A_3\bar{S}$ mineral decomposes largely at 1350° C., while the formation of Alite in clinker starts at 1450° C. Therefore, from thermodynamics point of view, $C_4A_3\bar{S}$ and Alite cannot co-exist in the same system. At present, Portland cement clinker containing $C_4A_3\bar{S}$ mineral is mainly prepared by doping fluorite and gypsum to Portland cement raw meal, which then is calcined at 1300~1400° C.

However, at present, most of cement is prepared via dry calcination in China, where the calcination temperature is around 1450° C. As a result, most of the $C_4A_3\bar{S}$ formed in the cement clinker has been decomposed, leaving only a small amount of $C_4A_3\bar{S}$ in cement clinker. This results in a deficiency of certain properties (such as initial strength) of Portland cement containing $C_4A_3\bar{S}$ mineral. Therefore, methods for preparation of Portland cement clinker containing $C_4A_3\bar{S}$ have not been industrialized in China and most of cement enterprises still produce traditional Portland cement clinker in pre-calcining kiln.

SUMMARY OF THE INVENTION

An object of the present invention is to improve the calcining process of Portland cement clinker containing $C_4A_3\bar{S}$ mineral and to provide a secondary synthetic method for preparation of calcium sulphoaluminate mineral in Portland cement clinker. As a result, the initial strength of cements formed in this manner are improved and the requirements for production of Portland cement clinker containing $C_4A_3\bar{S}$ mineral in large pre-calcining kilns can be met.

To realize above mentioned object, the technical scheme of present invention is a secondary synthetic method for calcium sulphoaluminate mineral in Portland cement clinker, where the method comprises the following steps:

(1) Gypsum is doped to Portland cement raw meal so that the content of $SO_3$ in the raw meal is 0.5~6.0 wt %.

(2) The prepared raw meal is calcined, the temperature is increased to 1400~1600° C. at a rate of 1~25° C. per minute, kept at said temperature, and then naturally cooled.

(3) The cooled clinker is heated to 800~1300° C. at a rate of 1~25° C. per minute, kept at this temperature, and then naturally cooled.

(4) The cooled clinker is grounded to powder with the aid of ball mill.

In alternative embodiments, a secondary synthetic method for calcium sulphoaluminate mineral in Portland cement clinker consists of the following steps:

(1A) Gypsum is added to Portland cement raw meal so that the content of $SO_3$ in the raw meal is 0.5~6.0 wt %.

(2A) The prepared raw meal is calcined. The temperature is increased to 1400~1600° C. at a rate of 1~25° C. per minute and kept at this temperature. Then it is transferred to a cooler and the temperature is reduced at a rate of 40~80° C. per minute to a temperature of 800-1300° C.

(3A) When the temperature reaches 800-1300° C., the temperature is held and then it is naturally cooled.

(4A) The cooled cement clinker is grounded to powder with the aid of ball mill.

Preferably, the holding time of steps (2), (3), (2A) and (3A) is 5~120 min, respectively. Preferably, the specific surface area of grounded powder of steps (4) and (4A) is 340~360 m²/kg.

Calcination of the prepared raw meal in steps (2) and (2A) is carried out under regular processing parameters.

DETAILED DESCRIPTION

The present invention relates to the thermal treatment of Portland cement clinker containing calcium sulphoaluminate mineral. Through the thermal treatment, calcium sulphoaluminate mineral which has been decomposed at high temperature is reformed. Thus the content of calcium sulphoaluminate mineral in the cement clinker is improved and the function of calcium sulphoaluminate mineral in Portland cement clinker is brought into full play. As a result, the short-term and long-term properties of cement clinker are improved and the doping amount of composite material in the resultant cement is increased.

EXAMPLES

The present invention is further illustrated with reference to the following examples. However, it may be understood that the present invention is not limited to the following examples.

Example 1

(1) 0.30 kg gypsum (the $SO_3$ content in gypsum is 32.90 wt %) was added as a dopant to 5 kg of a prepared Portland cement raw meal (the chemical compositions of cement raw meal are shown in Table 1). As a result, the $SO_3$ content in raw meal was 1.86 wt %.

(2) The prepared cement raw meal was heated to 1480° C., calcined for 30 min, and cooled. Subsequently, the temperature was increased to 1450° C. at a rate of 5° C. per minute, kept at this temperature for 30 min, and then was cooled.

(3) The cooled cement clinker was increased at a rate of 10° C. per minute until it reached 1200° C., kept at this temperature for 60 min, and then was cooled.

(4) The cooled cement clinker was grounded to powder with the aid of ball mill, where the specific surface area of the powder was 350 m²/kg. According to the test method disclosed in CN200710302594.1, the entirety of which is incorporated by reference, it was determined that the $C_4A_3\bar{S}$ content of cement clinker produced by Xuzhou Huaihai Cement Factory (without thermal treatment) was 0.5 wt %, and the $C_4A_3\bar{S}$ content of cement clinker of present Example 1 was 4.8 wt % after thermal treatment.

(5) 4 g gypsum was added to 96 g of the cement clinker obtained according to the method disclosed above. The mixture was subsequently mixed uniformly, 29 mL of water (ratio between water and cement w/c=0.29) was added and the mixture was stirred and molded to 20×20×20 mm samples from which the 1d, 3d and 28d compressive strength could be determined. Samples were first cured in a curing case for 24 h, where the relative humidity was 90% and the temperature was 20±2° C. Then the demolded sample was cured in a water curing case at 20±1° C. The comparison of resulting strength is shown in Table 2.

TABLE 1

Chemical composition of raw meal

| Loss | CaO | SiO$_2$ | Al$_2$O$_3$ | Fe$_2$O$_3$ | MgO |
|---|---|---|---|---|---|
| 34.02 | 43.94 | 14.28 | 2.42 | 2.26 | 1.19 |

TABLE 2

Paste strength of Portland cement containing calcium sulphoaluminate mineral(MPa)

| Examples | 1 d | 3 d | 28 d |
|---|---|---|---|
| Xuzhou Huaihai Cement Factory (Portland cement clinker containing calcium sulphoaluminate mineral) | 43.4 | 57.6 | 86.4 |
| Example 1 | 55.7 | 66.9 | 94.2 |

Example 2

(1) 0.28 kg gypsum (the SO$_3$ content of gypsum is 32.90 wt %) was added to 5 kg of a prepared Portland cement raw meal (the chemical compositions of cement raw meal are shown in Table 1). As a result, the SO$_3$ content of raw meal was 1.74 wt %;

(2) The prepared cement raw meal was heated to 1450° C., calcined for 60 min and cooled. Subsequently, the temperature was increased to 1400° C. at a rate of 10° C. per minute, kept at this temperature for 50 min, and then cooled.

(3) The temperature of the cooled cement clinker was increased at a rate of 15° C. per minute until it reached 1250° C., kept at this temperature for 90 min, and then cooled.

(4) The cooled cement clinker was grounded to powder with the aid of a ball mill, where the specific surface area of the powder was 360 m$^2$/kg.

(5) 4 g gypsum was added to 96 g of the cement clinker formed according to the above described process. The mixture was mixed uniformly and, subsequently, 29 mL water (ratio between water and cement w/c=0.29) was added. The mixture was stirred and molded to 20×20×20 mm samples from which the 1d, 3d and 28d compressive strength could be determined. Samples were first cured in a curing case for 24 h, where the relative humidity was 90% and the temperature was 20±2° C. Then the demolded sample was cured in a water curing case at 20±1° C. The comparison of resulting strength is shown in Table 3.

TABLE 3

Paste strength of Portland cement containing calcium sulphoaluminate mineral (MPa)

| Examples | 1 d | 3 d | 28 d |
|---|---|---|---|
| Xuzhou Huaihai Cement Factory (Portland cement clinker containing calcium sulphoaluminate mineral) | 43.4 | 57.6 | 86.4 |
| Example 2 | 54.5 | 67.0 | 93.8 |

Example 3

(1) 0.3 kg gypsum (the SO$_3$ content of gypsum is 32.90 wt %) was added to 5 kg of a Portland cement raw meal (the chemical compositions of cement raw meal are shown in Table 1). As a result, the SO$_3$ content of raw meal was 1.86 wt %.

(2) The prepared cement raw meal was heated to 1450° C. calcined for 60 min and cooled; subsequently, the temperature was increased to 1450° C. at a rate of 5° C. per minute and kept at said temperature for 30 min, and then it was transferred to a cooler, the temperature was reduced at a rate of 55° C. per min.

(3) The temperature was cooled to 1250° C., and kept at said temperature for 60 min, and then it was cooled again.

(4) The said cooled cement clinker was grounded to powder with the aid of ball mill, the specific surface area of said powder is 340 m$^2$/kg.

(5) 4 g gypsum was added to 96 g final obtained cement clinker, the said mixture was mixed uniformly, subsequently, 29 mL water (ratio between water and cement w/c=0.29) was added, the said mixture was stirred and molded to 20×20×20 mm samples, and the 1d, 3d and 28d compressive strength was determined. Samples were first cured in a curing case for 24 h, wherein the relative humidity was 90% and the temperature was 20±2° C., and then the demolded sample was cured in a water curing case at 20±1° C. The comparison of resulting strength is shown in Table 4.

TABLE 4

Paste strength of Portland cement containing calcium sulphoaluminate mineral(MPa)

| Examples | 1 d | 3 d | 28 d |
|---|---|---|---|
| Xuzhou Huaihai Cement Factory (Portland cement clinker containing calcium sulphoaluminate mineral) | 43.4 | 57.6 | 86.4 |
| Example 3 | 47.2 | 64.2 | 91.5 |

Example 4

(1) 0.28 kg gypsum (the SO$_3$ content of gypsum is 32.90 wt %) was added to 5 kg of a Portland cement raw meal (the chemical compositions of cement raw meal are shown in Table 1). As a result, the SO$_3$ content of raw meal was 1.74 wt %.

(2) The prepared cement raw meal was heated to 1450° C., calcined for 60 min and cooled. Subsequently, the temperature was increased to 1400° C. at a rate of 10° C. per minute, kept at this temperature for 50 min, and then it was transferred to a cooler, where the temperature was reduced at a rate of 50° C. per min to 1200° C.

(3) The temperature was kept at this temperature for 30 min, and then it was cooled.

(4) The cooled cement clinker was grounded to powder with the aid of ball mill, where the specific surface area of the powder was 340~360 m²/kg.

(5) 4 g gypsum was added to 96 g of the cement clinker obtained according to the method disclosed above. The mixture was mixed uniformly and, subsequently, 29 mL water (ratio between water and cement w/c=0.29) was added. The mixture was stirred and molded to 20×20×20 mm samples from which the 1d, 3d and 28d compressive strength could be determined. Samples were first cured in a curing case for 24 h, where the relative humidity was 90% and the temperature was 20±2° C. Then the demolded sample was cured in a water curing case at 20±1° C. The comparison of resulting strength is shown in Table 5.

TABLE 5

Paste strength of Portland cement containing calcium sulphoaluminate mineral (MPa)

| Examples | 1 d | 3 d | 28 d |
|---|---|---|---|
| Xuzhou Huaihai Cement Factory (Portland cement clinker containing calcium sulphoaluminate) | 43.4 | 57.6 | 86.4 |
| Example 4 | 45.2 | 65.8 | 92.0 |

What is claimed is:

1. A secondary synthetic method for providing calcium sulphoaluminate mineral in Portland cement clinker, wherein the method comprises:
   adding an amount of an $SO_3$ containing gypsum to a Portland cement raw meal so that the $SO_3$ content of raw meal is 0.5-6.0 wt %;
   calcinating the prepared raw meal to form a cement clinker, wherein the calcinating comprises:
      increasing the temperature of the raw meal to a first temperature between 1400-1600° C. at a rate of 1-25° C. per minute;
      holding the temperature at the first temperature, and naturally cooling the cement clinker;
   heating the cooled cement clinker to a second temperature of 800-1300° C. at a rate of 1-25° C. per minute;
   holding the temperature of the cement clinker at the second temperature;
   naturally cooling the cement clinker; and
   grinding the cooled clinker to a powder.

2. The method according to claim 1, wherein the holding times of the calcinating and heating operations are each 5-120 minutes, respectively.

3. The method according to claim 1, wherein the specific surface area of the ground clinker powder is 340-360 m²/kg.

4. The process according to claim 1, wherein the cooled clinker is ground to a powder using a ball mill.

5. A secondary synthetic method for providing calcium sulphoaluminate mineral in Portland cement clinker, the method comprising:
   adding an amount of an $SO_3$ containing gypsum to a Portland cement raw meal such that the $SO_3$ content of the raw meal is 0.5-6.0 wt %;
   calcinating the raw meal to form a cement clinker, wherein the calcination comprises:
      heating the Portland cement raw meal to a first temperature between 1400-1600° C. at a rate of 1-25° C. per minute;
      holding the temperature at the first temperature; and
      cooling at a rate of 40-80° C. per minute to 800-1300° C.;
      holding the temperature at 800-1300° C.; and
      naturally cooling the formed cement clinker; and
   grinding the cooled clinker to a powder.

6. The method according to claim 5, wherein the holding times are each 5-120 minutes.

7. The method according to claim 5, wherein the specific surface area of powder of the ground clinker is 340-360 m²/kg.

8. The method according to claim 5, wherein the cooled clinker is ground to a powder using a ball mill.

9. The method according to claim 5, wherein cooling at a rate of 40-80° C. is performed using a cooling device.

* * * * *